(12) United States Patent
Narayanan

(10) Patent No.: US 9,031,971 B2
(45) Date of Patent: May 12, 2015

(54) FLEXIBLE DATA DOWNLOAD MODELS FOR AUGMENTED REALITY

(75) Inventor: Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 834 days.

(21) Appl. No.: 13/051,838

(22) Filed: Mar. 18, 2011

(65) Prior Publication Data

US 2012/0019673 A1    Jan. 26, 2012

Related U.S. Application Data

(60) Provisional application No. 61/367,300, filed on Jul. 23, 2010.

(51) Int. Cl.
*G06F 7/00* (2006.01)
*G09G 5/00* (2006.01)
*G06F 17/30* (2006.01)

(52) U.S. Cl.
CPC .... *G06F 17/30244* (2013.01); *G06F 17/30241* (2013.01)

(58) Field of Classification Search
USPC ............... 725/105; 707/759, 769; 345/633
See application file for complete search history.

(56) References Cited

U.S. PATENT DOCUMENTS

| 7,389,181 | B2 | 6/2008 | Meadow et al. | |
|---|---|---|---|---|
| 7,529,639 | B2 | 5/2009 | Rasanen et al. | |
| 8,301,202 | B2 * | 10/2012 | Lee | 455/566 |
| 2006/0089792 | A1 * | 4/2006 | Manber et al. | 701/207 |
| 2007/0219706 | A1 | 9/2007 | Sheynblat | |
| 2009/0083275 | A1 * | 3/2009 | Jacob et al. | 707/10 |

(Continued)

FOREIGN PATENT DOCUMENTS

| JP | 2010152884 A | 8/2010 |
|---|---|---|
| KR | 20100068468 A | 6/2010 |

OTHER PUBLICATIONS

Benjamin Gotow J et al., "Addressing, Challenges with Augmented Reality, Applications on Smartphones", Lecture Notes of the Institute for Computer Sciences, Social Informatics and Telecommunications Engineering, vol. 48, Jun. 30, 2010, pp. 129-143, XP008144123, ISSN: 1867-8211, DOI: 10.1007/978-3-642-17758-3 10 ISBN: 978-3-642-17758-3 Retrieved from the Internet: URL:https://springerlink3.metapress.com/content/nvl6527027407256/resource secured/"target=fulltext.pdf&sid=i3hlhak3cavekhmkbahoelyj&sh=www.springerlink.com [retrieved on Nov. 30, 2010].

(Continued)

*Primary Examiner* — Twyler Haskins
*Assistant Examiner* — Peter Chon
(74) *Attorney, Agent, or Firm* — Jennifer M. Pascua

(57) ABSTRACT

In an AR system, method for operating same, a mobile device, and method for operating same, flexible loxels are used that may be different for different image data providers. This enables AR applications to download smaller loxels which have more information, such as dense areas, like in cities, or larger loxels which have less information, like, for example, desert areas. Data downloads may take into account client orientation and direction of motion to determine incremental data that need to be downloaded as the client moves. The loxels are coded with loxel identifiers mapped to location information, so only the necessary loxels for a particular application need be downloaded, allowing the client to autonomously decide when to acquire new image data and how much data to acquire.

32 Claims, 7 Drawing Sheets

(56) References Cited

U.S. PATENT DOCUMENTS

2010/0008265 A1    1/2010  Freer
2010/0135527 A1    6/2010  Wu et al.

OTHER PUBLICATIONS

Hile, H. et al., "Landmark-Based Pedestrian Navigation from Collections of Geotagged Photos", Proc. 7th. Int. Conf. on Mobile and Ubiquitous Meida, MUM 2008, ACM, Dec. 3, 2008, Dec. 5, 2008, pp. 145-152, XP002661742, Umea, Sweden Retrieved from the Internet: URL:http://dl.acm.org/citation.cfm"id=1543 167 [retrieved on Oct. 20, 2011].

International Search Report and Written Opinion—PCT/US2011/045111—ISA/EPO—Nov. 3, 2011.

Takacs G, et al., "Outdoors augmented reality on mobile phone using loxel-based visual feature organization", Proceedings of the 2008 ACM International Conference on Multimedia with Co-Located Symposium & Workshops, Vancouver, BC, Canada, Oct. 27, 2008, pp. 427-434, XP007915264, DOI: 10.1145/1460096.1460165 ISBN: 978-1-60558-312-9, In particular, Sections 1, 2, 3 and 5.

* cited by examiner

FLEXIBLE DATA DOWNLOAD MODELS FOR AUGMENTED REALITY

CROSS REFERENCE TO RELATED APPLICATIONS

This application claims the benefit of U.S. provisional application No. 61/367,300 filed Jul. 23, 2010, which is hereby incorporated by reference.

FIELD

The current disclosure relates to methods, apparatuses and systems for providing augmented reality devices and displays; for example, in mobile devices.

BACKGROUND

Recently, there has been considerable interest in augmented reality (AR), a state in which real-world and virtual realities are combined and which is interactive in real time. A commonly known example of AR is the yellow "first down" lines seen in television broadcasts of American football games. The real-world elements are the football field and players, and the virtual element is the yellow line, which is drawn over the image of the field by computers in real time. Similarly, rugby fields and cricket pitches are branded by their sponsors using augmented reality; giant logos are inserted onto the fields when viewed on television. In some current applications like in cars or airplanes, "heads-up" displays are integrated into the windshield to show information overlays on the real-world seen by the driver or pilot.

AR applications typically rely on image data present in backend databases for image detection and tracking. Image data typically comprises key points of raw images that have been pre-loaded into backend databases, although additional image data can be incrementally added to the database at any time, as well.

As mobile devices, such as cell phones and the like, have become more ubiquitous, and the functionality and features of such devices have increased, uses of AR are being realized to an ever increasing degree. One AR system that has been proposed uses a camera built into a mobile phone. The user takes a picture, which is wirelessly sent to a server that matches the picture with database images. The server then returns a database image to the phone, where it may be superimposed onto the original image. The database image may contain, for example, information regarding the features seen in the original camera image, such as building names, histories of structures or other items in view, or the like.

Since mobile AR implementations rely on receiving image data and performing image detection and matching against the camera view obtained on the mobile device locally, for best performance, the image data is typically loaded in the RAM of the mobile device for detection purposes. Limitations in the available RAM and wireless bandwidths present a challenge in the amount of image data that can be downloaded and used at any given time. In order to overcome some of the challenges, the location of the mobile device may be used to restrict the amount of image data downloaded and used at any given time. However, available systems may not provide a suitable combination of performance, bandwidth, and power useage.

One of the challenges in realizing an improved AR system is determining the location of the mobile device to enable the server to efficiently perform the necessary image processing. One way by which the location of the mobile device may be determined is by GPS position location, alone, or with the assistance of cellular base station location information. Systems that have been proposed use rough location determinations, for example, within one or two city blocks.

In one system, the mobile device is configured to prefetch data related to the current location of the mobile device, then the user takes a photograph of the location of interest using the camera associated with the mobile device. The image of the photograph is then matched with the prefetched data, and the result is displayed to the user.

To manage the large quantities of data, it has been proposed to organize a global geo-coordinate space using cell-based organization, with limitations on the number of images or key points considered within each AR cell. (The term "AR cell" in this context is not the same as the term "cell" in the context of a cellular phone system.) An AR cell is termed a "loxel," indicating a location based pixel storage model. A loxel is typically associated with a particular location and spans a particular area (usually defined in rectilinear coordinates for simplicity). A kernel refers to an area generally visible from a particular loxel and is usually defined as spanning particular loxels or a configuration of loxels.

Depending on the location of the user, image data corresponding to a kernel area of 3×3 loxels is sent to the client, with the center of the kernel being the present loxel of the user. As the user enters a new loxel, additional image data is sent corresponding to the new kernel area. The loxel size that has been used is 30 meters by 30 meters. Although this technique makes a significant reduction in the amount of image data that needs to be sent to the user at any given time, it still has a few shortcomings.

In some systems, the number of incremental loxels that have to be downloaded at any time has been 3, taking into account only the motion of the mobile device along 4 major directions. In reality, there are 8 adjacent loxels to any given loxel. Hence, a movement into one of the adjacent loxels may need the data of up to 5 incremental loxels to be downloaded. Further, it is not always the case that the next valid use of the AR application occurs in an adjacent loxel. Depending on the application and the mobility of the user, the next valid loxel may be a non-adjacent loxel, in which case, more data needs to be downloaded.

The assumption has also been made that the download need only include incremental image data after the user has entered a new loxel. This can lead to suboptimal latency for fetching the image data, in turn causing an undesirable delay in the application calling for the data. This is especially true in cases where the next valid loxel is a non-adjacent one to the current loxel.

The assumption has also been made that a 360 degree field of view is of interest, with the focal point lying no further away than one of the adjacent loxels. While a 360 degree field of view may be necessary for panning when an AR application is in use, not all AR applications may need it. Furthermore, given that certain AR applications only have an intermittent usage pattern, downloading data for a 360 degree field of view may be overkill in some situations. A cell phone camera has at most a 70 degree field of view, a typical field of view being about 55 degrees. This puts the visible area for a static camera view within just one loxel. Depending on the size of the loxel, the camera view may include one or more adjacent loxels, but, on average, the camera view is still only 25% or less of what is assumed in a 360 degree field of view.

Typical systems proposed in the past do not provide a means for a mobile device to automatically detect when it arrives at a new loxel. By default, this requires the mobile device to continuously update the server with its new location, allowing the server to determine when to send the new data set. This approach is power consuming, especially if the AR applications were designed to run in the background for prolonged periods of time. Further, although there are multiple applications that do this, it presents privacy issues for the end consumer.

Another AR system that has been proposed is that of potentially visible sets (PVS). The concept of potentially visible sets has been known in computer vision for a long time. PVS was designed to take obstacles into consideration to determine the set of visible objects to a camera or human eye. The technique requires good training data on the obstacles to be available and a somewhat precise position determination and orientation of the camera relative to the obstacles in order to arrive at the visibility of a particular object. Hence, in addition to image data, PVS also requires data on the relative positioning of the camera and the obstacle with respect to the image in order to determine the potentially visible set of objects or images.

Efforts have been made to apply the use of PVS to augmented reality environments in lieu of pure cell-based organization of images. While the notion of obstacles is much more applicable in indoor environments (e.g., walls, visibility from inside a room, etc.), it does not as easily map to an outdoor environments in which obtaining training data for obstacles is often impractical. Further, arriving at a precise PVS for a given location and orientation of a camera is very complex and may require a not-so-trivial amount of data to be attached to key points in order to get acceptable matching rates. Hence, the use of PVS may not help the mobile outdoor AR uses in any significant manner when compared to a cell-based organization.

SUMMARY

One embodiment of the invention provides flexible loxels that may be different for different image data providers. Thus, for example, one embodiment of this invention uses loxels of flexible sizes. This enables AR applications to download smaller loxels which have more information, such as dense areas, like in cities, or larger loxels which have less information, like, for example, desert areas. Loxel size may also be sized using other factors, such as the GPS accuracy available in the areas of interest, or the like.

According to another embodiment of the invention, flexible data download models are provided that take into account client orientation and direction of motion in addition to location to determine incremental data that need to be downloaded; downloads can be tailored to maximize the efficiency based on the factors of importance to the applications.

According to still another embodiment of this invention, the loxels are coded with loxel identifiers, and location information is mapped to each coded loxel. This enables categorizing the image data associated with each loxel, enabling it to be looked up, only as needed. Thus, only the necessary loxels for a particular application need be downloaded.

The coding may be arranged such that clients can perform automatic computation of the identifications of the loxels that it needs. This allows the clients to autonomously decide when to acquire new image data and how much data to acquire. This results in savings in messaging, which, in turn, increases battery life by avoiding the need to constantly send location updates to the server. It also helps in providing better privacy to the clients by not having to disclose the accurate location of the client to the servers all the time.

According to one embodiment of the invention, using vector quantization on the loxel based data organization is provided to provide a unique code vector for each loxel. The client can then download a codebook of loxel identifiers and self-calculate the loxel in which it is located without needing constant location updates to the server. This conserves battery power and preserves privacy. The loxel identifications may be determined, for example, using vector quantization techniques in which the location of each loxel is expressed as a code vector in terms of a (latitude, longitude) pair. The (latitude, longitude) pair may be chosen, for example, as the mean of all the (latitude, longitude) pairs present in the loxel. When a client initializes, it contacts a master AR server to obtain a set of code vectors. It may do so by providing its current (latitude, longitude) parameters and obtaining a set of code vectors around its location, thereby enabling it to download at least a partial loxel codebook.

To determine the desired loxel codebook, the client finds the code vectors with the closest Euclidean distance from its current (latitude, longitude) location. As the client moves, it can locally compute the Euclidean distance to the nearby loxels and contact the server when it detects a change in its loxel ID or when it detects a need for new data based on its application usage. Hence, this model, while requiring an initial exchange with the server to obtain an initial codebook, provides both the flexibility for the server end to determine the optimal grid model and the performance enhancing and privacy preserving opportunity to the client to determine the appropriate time to contact the server for more data. At the same time, the model enables the client to determine for itself which loxels to download.

Thus, according to a broad augmented reality (AR) system embodiment, means are provided for adapting the AR model based upon the determined needs, camera view, and usage pattern of client equipment that uses an AR model. The AR model is based, at least in part, on a loxel based data organization which has a flexible loxel size organization in which a size of the loxels is related to an amount of information contained in the loxels. The loxel based data organization provides for coding of each loxel for identification, wherein the loxel coding may be autonomously decoded by clients. The loxel ID may be determined using vector quantization techniques, whereby a client can identify its current loxel by finding a loxel code vector with the closest Euclidean distance from the client's current latitude, longitude parameters, and as the client moves, as the client detects a change in its loxel ID it computes the smallest Euclidean distance to self-identify a next loxel to download.

According to another AR system embodiment, an AR server provides AR data organized into kernels of information. Each kernel is organized into a plurality of loxels, with each loxel associated with a geographical area in its respective kernel and being identified by a location vector. A client device can self-determine which loxels to download by determining which loxels are proximately located to the client. The client can self-determine which loxels are proximately located to it by determining a Euclidian distance to loxels in a kernel in which the client is located. Moreover, the client can self-determine which loxels exist in a direction of orientation of the client. At least some of the loxels are of the different sizes, wherein sizes of at least some of the loxels is related to an amount of information contained in the at least some of the loxels.

The location vector may be a code vector comprising a latitude, longitude pair in which the latitude, longitude pair corresponds to a location of at least a part of the loxel identified by the latitude, longitude pair.

According to an embodiment of a method for displaying augmented reality (AR) information on a client device, the client device is operated to self-determine its present position. A codebook of loxel location vectors requested by the client device from an AR server is provided to the client device, and the client device is operated to self-determine from the loxel location vectors and a present position of the client device an initial loxel in the codebook in which the client device is located. The method also includes providing to the client device AR information associated with a plurality of loxels specified by the client device.

The client device may be operated to self-determine if it has moved outside of the initial loxel, and if it has, the client device is operated to identify additional loxels from the loxel location vectors in the codebook, and to request AR information associated with the additional loxels. The additional loxels may be identified based on a direction of motion of the client device, by an orientation of the client device, or both. Additionally, the identifying additional loxels may be based on a field of view of a camera associated with the client device.

According to yet another embodiment of a method for displaying AR information on a client device, an AR application is run on the client device and a position location application is run on the client device to determine a present position of the client device. The client device requests loxel identification information from an AR server, based upon the position of the client device. The loxels are organized into kernels of information, each loxel being associated with a geographical area in its respective kernel, and being identified by a location vector. A set of loxel identifications is uploaded from the AR server to the client device in response to the request, the uploaded set of loxel identifications including identification of at least a loxel in which the client device is located. The set of loxel identifications may be uploaded as codebook. An application is run on the client device to locate an initial loxel in the uploaded set of loxels. Thereafter, if the client device determines that it has moved outside of the initial loxel, it initiates a request to the AR server to upload additional loxel identifications.

According to a broad aspect of a mobile device embodiment, the mobile device includes means for determining a present position of the mobile device, such as a position location engine implemented in hardware, software, firmware, or a combination. Means are also included for obtaining from an AR server location vectors of a plurality of loxels associated with respective geographical areas. The means may include a receiver/transceiver, associated receive circuitry, a processor, and memory, as well as other hardware, software, and/or firmware components. In addition, means are provided for identifying a set of the plurality of loxels based on the present position and the location vectors including at least an initial loxel in which the present position is located. The means may comprise a processor executing instructions to access the present position and to determine the set, as well as other hardware, software, and/or firmware components. Means (such as a receiver, transceiver, etc. as outlined above) may be included for uploading AR information for the set from the AR server.

In this embodiment, means may be included for determining if the mobile device has moved outside of the initial loxel, which may include a position engine as described above, and a processor to access position information and determine whether a position change is sufficient to indicate the need for additional loxels. If so, codebook information stored in memory may be accessed to identify additional loxels to upload. The additional loxels may be identified based on a direction of movement of the mobile device and/or an orientation of the mobile device. The mobile device may and upload the identified additional loxels. The mobile device may further include a camera, and the means for identifying additional loxels (such as the processor) identifies additional loxels based on a field of view of the camera. If the field of view of the camera is 70 degrees, and the additional loxels may be one or two loxels. If the field of view of the camera is 180 degrees, and the additional loxels may be three loxels (of course the number of loxels may be different than three; for example, any number of loxels greater than or equal to one). Any of the means described above may be implemented using hardware, software, firmware, or a combination, in particular any means known in the art.

According to a broad embodiment of an AR server system, a master AR server provides a codebook of loxel location vectors requested by a mobile device to enable the mobile device to self-determine a loxel in which the mobile device is located. At least one AR loxel server contains at least loxel identification information including loxel location vectors selectable by the master AR server to provide the codebook. An image database provides the AR information. Communications with the master AR server from the mobile device may be over the Internet. If desired, the AR server system may include an application server that provides AR application support to the mobile device, and special AR server may also be included for providing point of interest information to the mobile device for loxels in a vicinity of the mobile device.

According to a broad embodiment of a method for operating an AR server system, a master AR server is operated to provide a codebook of loxel location vectors requested by a mobile device to enable the mobile device to self-determine a loxel in which the mobile device is located and to provide AR information from loxels that have been self-identified by the mobile device. At least one AR loxel server for containing at least loxel identification information including loxel location vectors selectable by the master AR server to provide the codebook is operated. An image database is maintained for providing the AR information.

BRIEF DESCRIPTION OF THE DRAWINGS

In the various figures of the drawing, like reference numbers are used to denote like or similar parts.

DETAILED DESCRIPTION

As mentioned above, augmented reality (AR) applications rely on image data present in backend databases for image detection and tracking. Image data typically comprises key points of raw images that have been pre-loaded into the databases, although additional image data can be incrementally added to the database at any time. Mobile AR implementations rely on receiving image data and performing image detection and matching against the camera view obtained on the mobile device locally. To facilitate the database information download, one embodiment of the invention provides flexible loxel models that may be different for different types of image data. Thus, for example, one embodiment of this invention uses loxels of flexible sizes. This enables AR applications to download smaller loxels which have more information, such as information representing dense areas, like in cities, or larger loxels which contain less information, like, for example, information representing desert areas. Loxel size may also be sized using other factors, such as the GPS accuracy available in the areas of interest, or the like. For example, if the location uncertainty is relatively large, a larger loxel may be more likely to include relevant AR information for the actual mobile device position. By contrast, if the uncertainty is small, a smaller loxel size may be used. Furthermore, the flexible data download models can be configured to take into account client orientation and direction of motion in addition to location to determine incremental data that need to be downloaded, and downloads can be tailored to maximize the efficiency based on the factors of importance to the applications.

Figure 1:
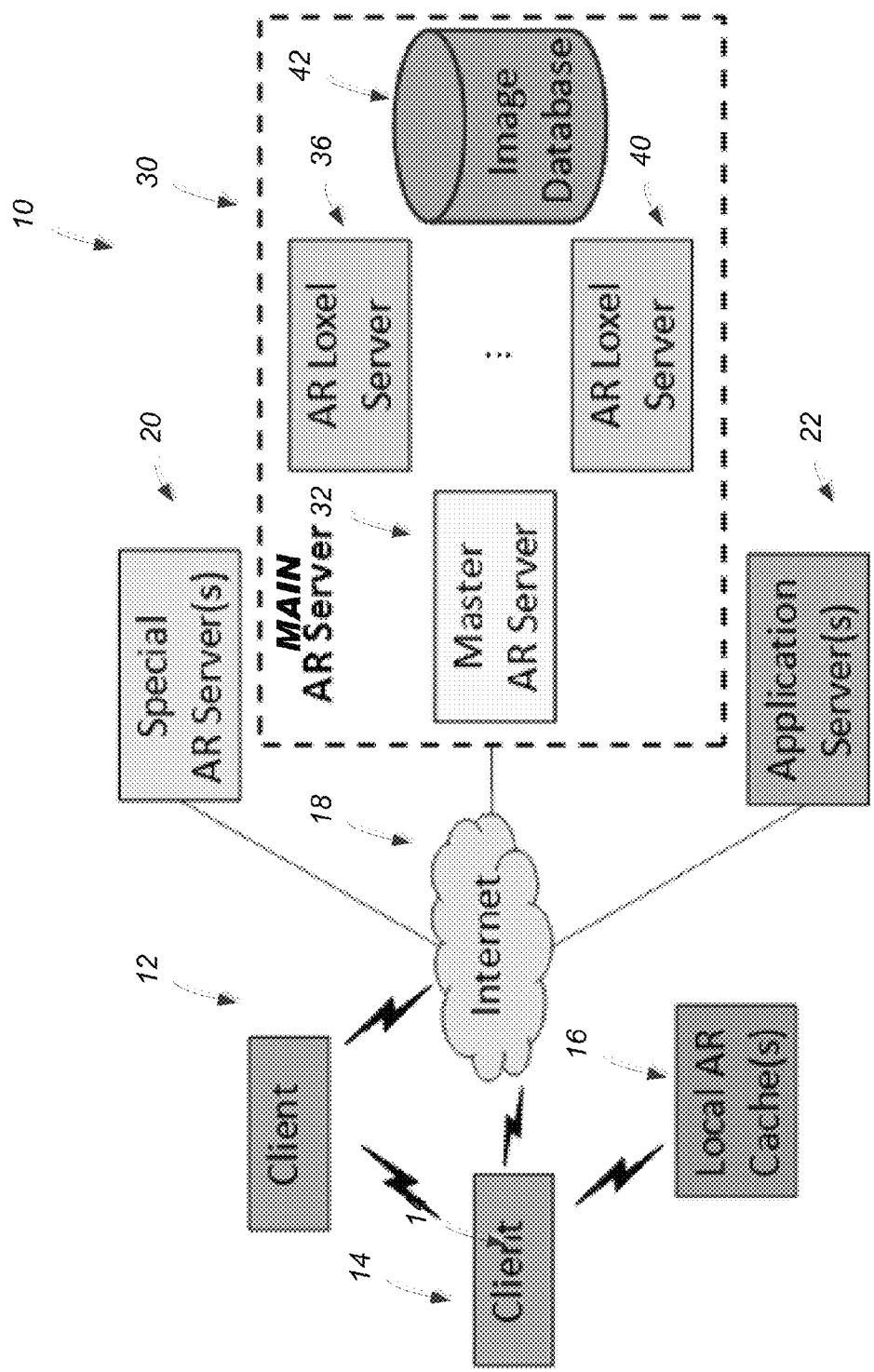
FIG. 1 is a block diagram of an AR system in which AR information is stored and provided to clients in the area serviced by the server.

An example of a AR system architecture 10 in which the flexible data download model may be implemented is shown in FIG. 1, to which reference is now made. In the embodiment illustrated, one or more augmented reality clients exist, two clients 12 and 14 being shown. Although two clients are shown, it will be understood that any number of clients may exist, depending upon the system bandwidth capabilities. AR applications may be running on the mobile devices 12 and 14. A local AR cache 16 is provided, having a cached descriptor database that is topologically close to the clients 12 and 14; for example, a server including a cached descriptor database. The local AR cache 16 provides local AR information. In the embodiment illustrated, the clients 12 and 14 communicate with each other, the local AR cache 16, and the Internet 18.

A special AR server 20 is provided, having a loxel database that is accessible via one or more networks such as the Internet 18 with which the clients 12 and 14 typically communicate. The special AR server may have, for example, a descriptor database that serves special functions, for instance, to handle non-geo-coded images, specific images of points of interest (POI), and the like. An optional application server 22 may be provided for use by AR applications on the clients 12 and 14.

A main AR server 30 provides the main AR capabilities, and includes a master AR server 32, AR loxel servers 36 . . . 40, and an image database 42. The master AR server 32 provides a front-end AR server component with which the client may initiate contact. The AR loxel servers 36 . . . 40 are a set of AR server components that contain geo-coded loxel-based image descriptors, and the image database is a database of full images (that is, compressed or uncompressed image data spanning the image rather than only key points). The image database may be distributed across several physical devices that may even be collocated with respective ones of the AR loxel servers 36 . . . 40.

In the embodiment of FIG. 1, the flexible data organization and download model can be augmented, based on application needs, client camera view and usage pattern. This model is fundamentally based on a loxel-based data organization, although it provides various enhancements to it. The design may be based upon the following guidelines: minimizing latency for various AR applications, making optimal use of available wireless bandwidth resources. providing flexible data organization techniques for image data providers, and minimizing the impact on client battery life.

The system 10 may use a global geo-coordinate system that is divided into non-overlapping "geo-square" cell areas. A "geo-square" is as a regular quadrilateral with all sides corresponding to equal physical distances (e.g., 30×30 m). It differs, for example, from grid squares used in the Maidenhead Locator System (MLS), which instead correspond to a geo-quadrilateral with equidistant latitude and longitude separations. A grid square is encompassed between 1 degree of latitude and 2 degrees of longitude at any point of the globe. Consequently, the grid squares end up having varying areas at different parts of the globe, some or most of which are unsuitable for consideration as loxels, given their sizes. In the described embodiments, arbitrary polygons or overlapping geo-squares unnecessarily complicate the design without adding any value and are hence not allowed as part of the model.

Different data providers may use different loxel sizes and hence no interoperability requirements need to be placed on it. As mentioned, different loxels may be of different sizes based on the object density or other parameters. Although a kernel typically encompasses 3×3 loxels, it may also vary depending on the size of the loxels themselves. For instance, if the loxel size is smaller than a certain threshold which allows the average error in location of the mobile device to span the area of 2 adjacent loxels, the kernel may need to include 5×5 loxels.

To generalize, the kernel area can be dynamically computed as $\pi*R^2/S^2$, where R is the radius of the 360 degree field of view around the loxel and S is the length of each side of the client's current loxel. When unequal loxel sizes are used, the kernel area calculation is more complex and needs to take the sizes of each adjacent loxel into account. For simplicity, a kernel area of 3×3 loxels is assumed herein, also assuming that the average error in location is never greater than one adjacent loxel, thereby keeping it within a kernel. Note that a loxel of size 30×30 m$^2$ satisfies this for even for worst case location accuracy errors (say, 50 m). Hence, the image data in a kernel can be used to perform detection, after which, the loxel can be more accurately determined.

The dynamicity of mapping kernels to loxels also has an impact on how the system handles pruning and how the image database can be optimized for downloads. Inter-loxel pruning can bring advantages in terms of overall prioritization of key points and minimizing of the amount of image data that is required for detection. However, pruning across the entire database means that the optimizations are only meaningful when the matching is done against the entire database. For a real world AR image database, this is impractical.

Hence, the available options are pruning the available data on a loxel basis (i.e., no inter-loxel pruning) vs. pruning on a kernel basis (to allow some inter-loxel pruning). In the former case, data can be downloaded loxel by loxel as needed without any impact. In the latter case, some optimizations will be lost when the data is downloaded in an incremental fashion. That is, downloading two or three incremental loxels corresponding to a new kernel means that the optimizations brought in by inter-loxel pruning within a kernel are not entirely used. Further, some key points that have been thrown away based on the kernel data may now actually be relevant in the scenario of incremental loxel download. Depending on the accuracy of matching, such key points may need to be separately maintained and transmitted, adding to the complexity of the download model. Presently, it appears that loxel-based pruning may be advantageous to allow incremental downloads, unless a demonstrable increase in optimization or accuracy is provided by the kernel-based pruning approach. However, in some scenarios, the two pruning approaches may be advantageous.

Each loxel has an identifier for categorizing and looking up the image data associated with it to enable a deterministic mapping of location information to the respective loxels. Location information may be obtained, for example, via GPS, A-GPS, WiFi triangulation or other technique. Irrespective of the mechanism used to obtain the location, the same loxel ID mappings should be obtained for a given location. Since indoor locations are not as easily mapped to loxels due to vastly different characteristics and inaccuracies in indoor positioning techniques, the loxel-based organization described herein is presently best suited for outdoor environments. Of course, indoor environments for which similar mapping possibilities exist can also use the design outlined here.

The use of loxel identifier enables automatic computation of loxel IDs by clients, since it allows the clients to autonomously decide when to acquire new image data and how much data to acquire. This can result in substantial savings in messaging and, in turn, battery life, by avoiding the need to constantly send location updates to the server. It also provides better privacy to the clients by not having to disclose the accurate location of the client to the servers all the time.

Current availability of location data seems to vary greatly across platforms (Android vs. Windows, Mobile vs. iPhone, etc.). Also, the accuracy of GPS data seems to vary greatly (1 m to 50 m in the worst case). Thus, standardized definitions of the grid model are used. This suggests normalized (latitude, longitude) and interoperable algorithms for determining the area enclosed by a grid-square, and so on. In the process, any flexibility in defining the loxel sizes or the grid model for different data providers will be lost. Hence, this design considers a hybrid approach for determining the loxel ID by the client.

Accordingly, vector quantization techniques are applied to the grid model to arrive at the loxel ID corresponding to a given location. Location is expressed in (latitude, longitude) pairs, and this is the least common denominator of any outdoor positioning technique. The grid model is determined by the master AR server 32 in a manner described below in detail. A code vector for each loxel is pre-computed by the master AR server 32 as well. The code vector is expressed as a (latitude, longitude) pair and can be chosen as the mean of all the (latitude, longitude) pairs present in a given loxel. The master AR server 32 stores a list of all code vectors and corresponding indices. The index of the code vector, termed the "loxel ID," is computed as the hash of the (latitude, longitude) parameters of the vector:

Loxel ID (LID)=SHA1 (latitude, longitude)

Thus, when a client, for instance client 12, initializes, it contacts the master AR server 32 to obtain a set of code vectors. It may do so by providing its current (latitude, longitude) parameters and obtaining a set of code vectors around its location. This allows downloading a partial codebook if the entire codebook download is seen as wasteful. However, a client may also request to download the entire codebook, in which case, the master AR server 32 sends the full list of code vectors. The client may store the codebook for future use; however, it should be noted that the codebook may vary across different data providers, hence, a particular codebook should only be assumed to be valid for a given master AR server. Consequently, if the codebook is cached by the client 12, it should be done against the matching master AR server 32.

To determine its current loxel, the client 12 finds the code vector with the closest Euclidean distance from its current (latitude, longitude) parameters. As the client moves, it can locally compute the Euclidean distance and contact the master AR server 32 when it detects a change in its loxel ID or when it detects a need for new data based on its application usage. Hence, this embodiment, while requiring an initial exchange with the master AR server 32 to obtain the codebook, provides both the flexibility for the server end to determine the optimal grid model and the performance enhancing and privacy preserving opportunity to the client 12 to determine the appropriate time to contact the master AR server 32 for more data.

In order to realize the grid model and maintain the mappings of the loxel IDs to various image elements, the master AR server 32 may store at least following elements:

A code vector list with corresponding loxel IDs (indices).
Loxel ID to AR loxel server ID mapping.
One primary and one or more secondary AR loxel servers.
Uptime of each AR loxel server.
AR caches indexed by loxel ID.
Number of replicas per loxel ID.
Dynamic variation based on popularity of access.
Popularity metric of a loxel ID.
Number of times a loxel ID is accessed within a time period (useful to determine caching thresholds).
Adjacency information.
Information about the kernel area corresponding to a particular loxel ID; this may typically be a collection of other Loxel IDs in the kernel.

The Master AR server 32 may store other elements in addition to this list as well.

In addition to the above, the actual loxel databases are stored in the AR loxel servers 36 . . . 40. The loxel database can be expressed in various languages (e.g., XML, SQL, etc.) and may contain the following elements:

Loxel IDs.
Feature descriptors, including individual feature descriptors and meta-feature descriptors.
Descriptor ranks. A descriptor rank may be computed based on the cluster size of the particular feature (the more images of the same object the feature appears in, the higher its rank). Other ranking computation techniques may also be used; for example, singleton features that provide unique matching capabilities may also have higher ranks.
Lists of image IDs (all images need to be associated with an ID in the image database), image coordinate tuples corresponding to the feature (image coordinates of the feature are useful for geometric consistency checks), alternate coordinates, altitude). Naturally, a pointer to the list may be maintained in the loxel database, with the actual list stored elsewhere (for example, in the image database).
Indicators that the image represents an object that itself has an alternate location (for example, user-generated-content (UGC) pictures). Alternate coordinates may be present to represent the location of the actual object in the image.
Altitude information, if available. This is useful to determine different views based on the viewing altitude and relative altitude of the various objects. Some of the considerations based on altitude, however, may be quite complex, such as the client's altitude, curvature of earth, the POI altitude, average obstruction in the viewing area, and the like, are all contributing factors.

POI data indexed by image IDs. This may also be a pointer with the actual data in a separate POI database. Names, addresses, and Universal Resource Identifiers (URIs) are examples of POI details that may be contained.

For the embodiments described herein, loxel information providing a 360 degree field of view is generally desirable for most applications in which the client is stationary with a valid camera view to enable panning. However, some applications may not always need such a wide field of view. For example, most cell phone cameras have a 70 degree, or less, field of view. The mobile AR applications may typically be tied to a usage pattern of a few minutes at a time, potentially with mobility between uses, and a valid camera view may not be continuously available.

Figure 2:
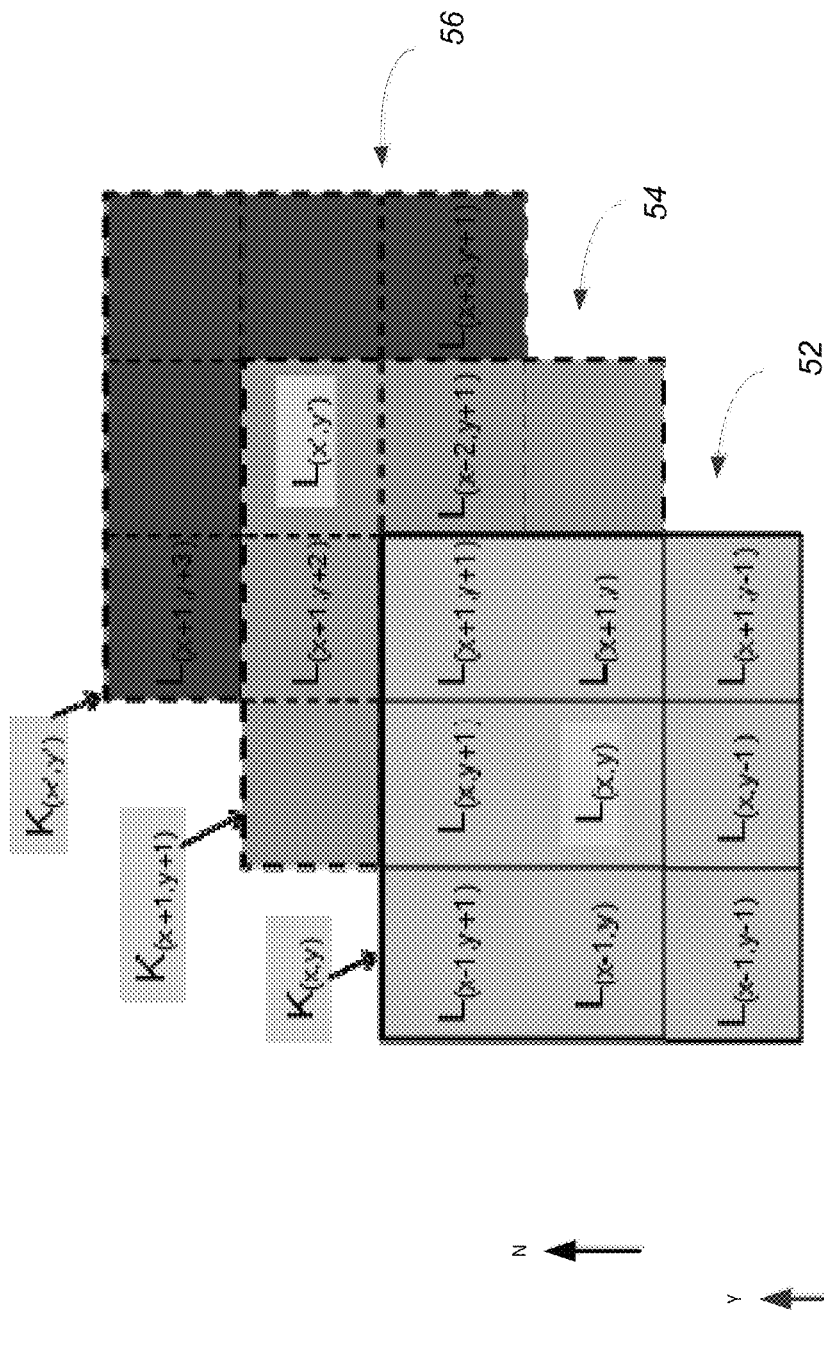
FIG. 2 is a diagram of three kernels of loxel sets illustrating a viewing area associated therewith.

FIG. 2, to which reference is now additionally made, is a diagram of three different kernel areas 52, 54, and 56 of loxel sets, illustrating the viewing areas associated therewith. The kernel areas 52, 54, and 56 are respectively denoted by $K_{(x,y)}$, $K_{(x+1,y+1)}$, and $K_{(x',y')}$, kernel area 56 being generalized as $K_{(x',y')}$, since for purposes of illustration, it need not be the next kernel in a running sequence.

The kernel areas 52, 54, and 56 are centered around loxels $L_{(x,y)}$, $L_{(x+1,y+1)}$ and $L_{(x',y')}$, respectively. As shown, a kernel is a 3×3 loxel area centered at a given loxel which corresponds with the current loxel of the client. For illustration, the kernels 52, 54, and 56 are shown on an X-Y axis, which is viewed from above; that is, kernels partially overlap such that the center loxel $L_{(x,y)}$ of kernel 52 resides at the loxel $L_{(x-1,y-1)}$ in the lower left corner of the next kernel 54, center loxel $L_{(x+1,y+1)}$ of kernel 54 resides at the loxel $L_{(x'-1,y'-1)}$ of kernel 56, and so on. Moreover, in the illustration of FIG. 2, the kernels 52, 54, and 56 appear to be progressing upward and to the right, since the example direction of motion of the client is North East. It should be understood that the kernels may progress in any direction corresponding to the client's movement. This will be discussed in greater detail below in considering the amount of data that must be downloaded as the client moves.

More specifically, for the field of view supported by most mobile phone cameras, it is usually wasteful to download a full kernel worth of data from the server. Therefore, given that fast image detection and matching requires image data to be loaded onto the RAM on the mobile device, it is preferable to have a lesser amount of relevant image data to perform the match against. On the other hand, it may be desirable to incrementally download image data as long as the AR engine/application of the client is active and able to process it. This presents a challenge, especially for embodiments in which the AR application runs in the background.

Thus, as an example, with a client, such as the client 12 of FIG. 1, at a loxel position of $L_{(x,y)}$ in kernel $K_{(x,y)}$ 52, and allowing for panning, all of the image data of the 3×3 loxel matrix corresponding to kernel $K_{(x,y)}$ 52 may be initially downloaded. In a scenario in which the client 12 moves North East into loxel $L_{(x+1,y+1)}$ of kernel $K_{(x,y)}$ 52, the loxels of kernel $K_{(x+1,y+1)}$ 54 become relevant, and the client 12 becomes located in the center loxel $L_{(x+1,y+1)}$ of kernel $K_{(x+1,y+1)}$ 54. As the client 12 moves into loxel $L_{(x+1,y+1)}$ of kernel 54, based on the direction of motion and field of view of the client's camera, image data is incrementally downloaded. For instance, the client may incrementally download loxels $L_{(x+1,y+2)}$, $L_{(x+2,y+2)}$ and $L_{(x+2,y+1)}$ for a 180 degree field of view, while the client continues to head North East. This may continue until the client is stationary again and has a valid camera view and expected trajectory, translated to orientation. Ultimately, the client stops in the example of FIG. 2 at loxel $L_{(x+2,y+2)}$ of the kernel $K_{(x+1,y+1)}$ 54, which is at the center loxel $L_{(x',y')}$ of kernel $K_{(x',y')}$ 56, and incrementally downloads loxels $L_{(x'-2,y'+3)}$, $L_{(x'+3,y'+3)}$ and $L_{(x'+3,y'+2)}$ for a 180 degree field of view.

Figure 3:
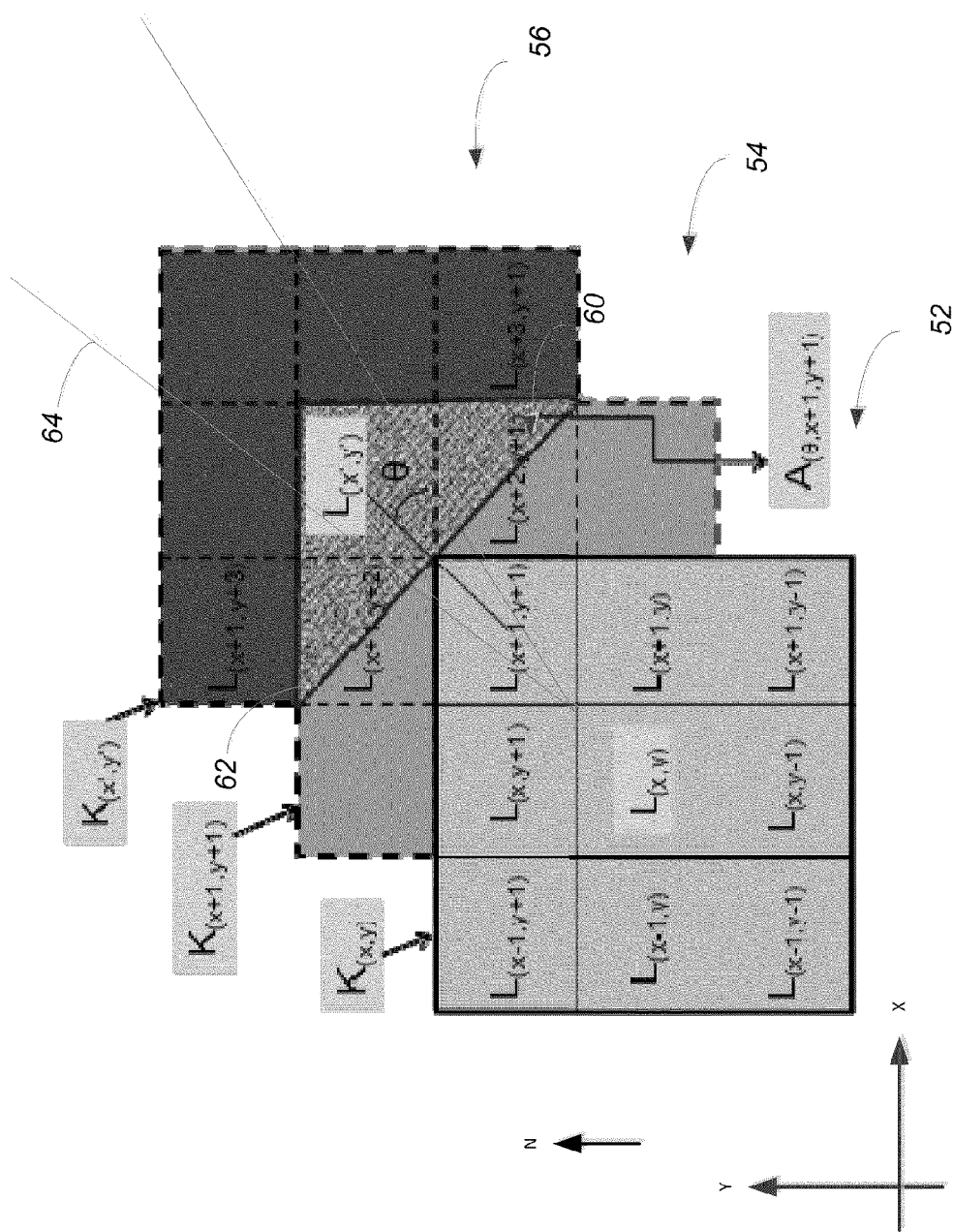
FIG. 3 is a diagram of the three different kernel areas of FIG. 2 illustrating a viewing area corresponding to L(x+1,y+1) and an orientation angle $\theta$.

FIG. 3, to which reference is now additionally made, is a diagram of the three different kernel areas 52, 54, and 56 of loxel sets illustrating a viewing area corresponding to $L_{(x+1,y+1)}$ and an orientation angle θ. The area $A_{θ,x+1,y+1}$ 60 illustrates a viewing area centered at $L_{(x+1,y+1)}$ of kernel 52 with focal point centered in loxel $L_{(x',y')}$ of kernel 56, resulting in an orientation of θ (shown for θ≈45 degrees), again assuming a viewing area of 180 degree field of view 62. A more realistic field of view 64 of 70 degrees will limit the viewing area to just one loxel, and for any given orientation, it will limit the viewing area to, at most, two loxels.

Thus, a conservative data download embodiment may be implemented with incremental data downloads of just one or two loxels based on the orientation angle, or based on a direction of motion when a valid orientation is not available. When the device goes stationary again with a valid camera view more data may be downloaded; however, depending on the type of application, this may be acceptable. It should be noted that when the mobile device is moving, the camera view is likely to be invalid, since the device may not be pointing at any valid target. That is, the device may be holstered, in a pocket, or pointing down, for instance.

Eight possible directions of motion are sufficient to logically span the adjacent loxels in a kernel. For any given direction of motion, θ can be assumed to be the angle between the directional line and the positive x-axis of the reference coordinate (with True North being used, for example, as the reference). When the device is stationary and has a valid camera view again, a more meaningful θ may be obtained to determine the remaining loxels that need to be downloaded.

Thus, assuming a 360 degree field of view, when the client 12 moves in kernel 52 from loxel $L_{(x,y)}$ to loxel $L_{(x+1,y+1)}$, a download of five loxels will result (loxels $L_{(x,y+2)}$, $L_{(x+1,y+2)}$, $L_{(x+2,y+2)}$, $L_{(x+2,y+1)}$, and $L_{(x+2,y)}$) will result in the client 12 maintaining a full view of kernel 54. For a 180 degree field of view, the amount of data needed is reduced to three loxels (loxels $L_{(x+1,y+2)}$, $L_{(x+2,y+2)}$ and $L_{(x+2,y+1)}$), and for a 70 degree field of view, it is reduced further to a single loxel (loxel $L_{(x+2,y+2)}$).

One embodiment may assume that no information is downloaded when the device is moving; however, this would result in eight loxel downloads when the device goes stationary again in $L_{(x',y')}$. Thus, with aggressive incremental downloads as the client 12 moves, the new data needed at this point can be reduced to two loxels. With more conservative incremental downloads, this may be six loxels. However, based on the needs of the application and usage models, the incremental downloads can be adapted to best suit the desired user experience. In general, there is a tradeoff between wasteful data downloads and more seamless operation when the AR application is resumed. When local AR servers are available, conservative incremental downloads may suffice if subsequent data can be pushed to the local AR server for faster downloads.

With 30 bytes per feature (assuming compression), 1000 features per object (across 5 views after clustering and pruning) and 5 objects per kernel, the amount of data in a loxel is about 150 kbytes. Hence, incremental downloads of 1-3 loxels result in incremental data of 1.2-3.6 Mbits being exchanged.

Figure 4:
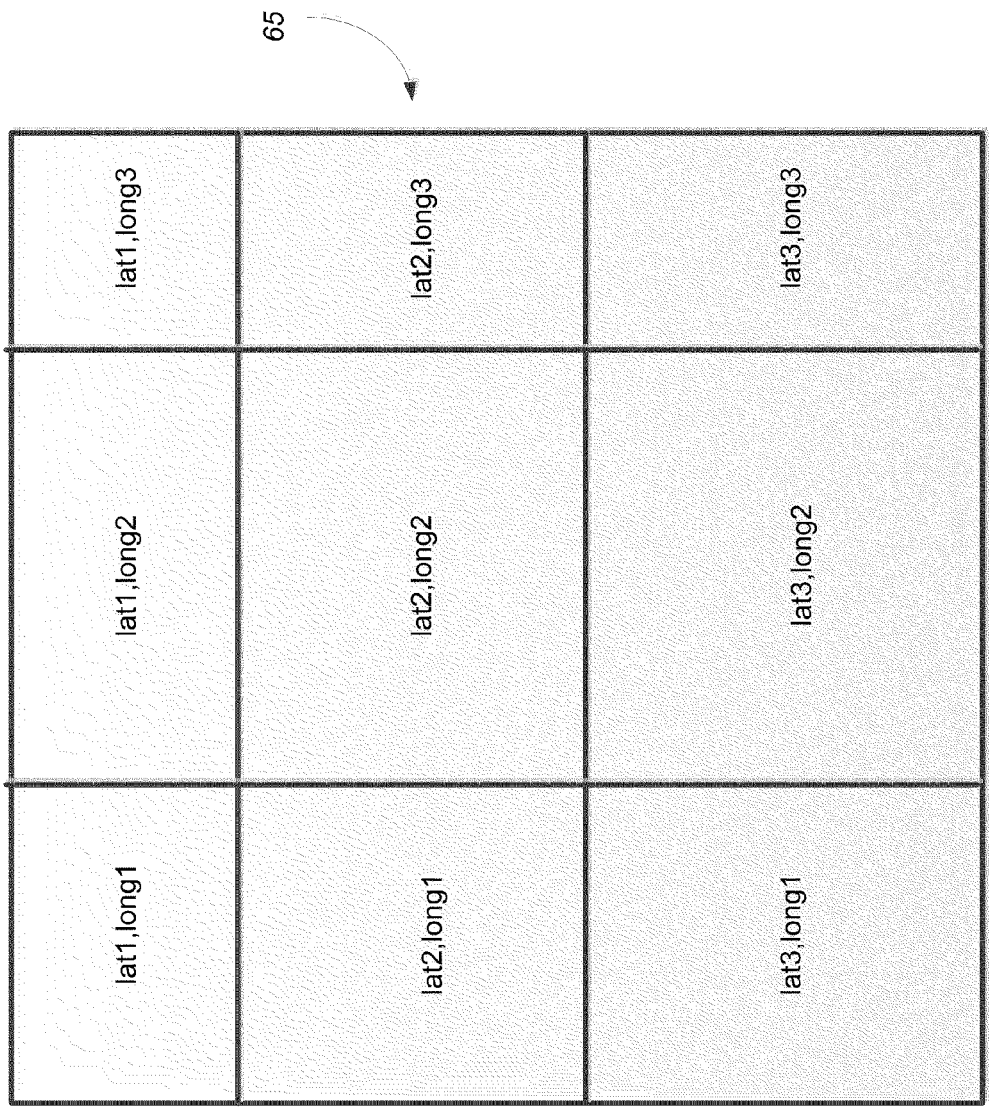
FIG. 4 is a diagram of a kernel area having loxels of different sizes.

Moreover, as mentioned above, the loxels may be of different sizes, as shown in FIG. 4, to which reference is now additionally made. As shown, a kernel 65 contains nine loxels, each containing a code vector identifying the respective loxel. The particular loxel sizes depend on a number of factors. Thus, for example, AR applications may download smaller loxels which have more information, such as dense areas, like in cities, or larger loxels which have less information, like, for example, desert areas. Loxel size may also be sized using other factors, such as the GPS accuracy available in the areas of interest, or the like.

Each loxel is identified by a code vector, for example, a latitude, longitude pair, as shown. The particular latitude, longitude pair associated with a particular loxel can be determined in a number of ways. For example, the latitude, longitude pair may be determined using vector quantization on the loxel based data organization to provide a unique code vector per loxel. This enables the latitude, longitude pairs in a particular geographical area to be arranged in a codebook that the client can download. From the loxel identifiers in the codebook, the client 12 can self-calculate the loxel in which it is located, without needing constant location updates to the master AR server 32. This conserves battery power and preserves privacy. The loxel identifications may be determined, for example, using vector quantization techniques in which the location of each loxel is expressed as a code vector in terms of a (latitude, longitude) pair chosen, for example, as the mean of all the (latitude, longitude) pairs present in the loxel. The (latitude, longitude) pairs present in the loxel may include, for example, the (latitude, longitude) pairs associated with each point of interest located within the loxel. Those skilled in the art will recognize other methods for generating unique loxel identifiers, such as code vectors, (latitude, longitude) pairs, and the like.

To determine the desired loxel codebook, the client finds the code vectors with the closest Euclidean distance from its current (latitude, longitude) location. As the client 12 moves, it can locally compute the Euclidean distance to the nearby loxels and contact the master AR server 32 when it detects a change in its loxel ID or when it detects a need for new data based on its application usage. Hence, this model, while requiring an initial exchange with the master AR server 32 to obtain an initial codebook, provides both the flexibility for the master AR server 32 end to determine the optimal grid model and the performance enhancing and privacy preserving opportunity to the client 12 to determine the appropriate time to contact the master AR server 32 for more data. At the same time, the model enables the client to determine for itself which loxels to download.

Appropriate data download requirements may vary, depending on the particular AR application; however, the following list provides a preliminary analysis on what may be appropriate for some of the AR application categories.

Navigation/Maps

Require reasonably fast response times

Panning may be less critical (at least continuous panning with mobility)

Incrementally downloading data based on field of view and direction of motion seems to be optimal for this application category Additional criteria for data download may be the desired destination and its location with reference to current user location More data may need to be downloaded when panning is needed Social Networking Less than real-time response times acceptable Panning may be needed Conservative incremental download of data based on field of view and direction of motion is probably acceptable when camera view is not valid More data needs to be downloaded when a valid camera view is available for panning purposes, but the increased response times are probably less of an issue Gaming Highly real-time response times required Panning may be needed to some extent (180 degrees probably sufficient)

Incremental downloads need to be more aggressive, accounting for at least a 180 degree field of view with fast responses Usage patterns are quite different, providing continuous valid camera views for the duration of the game and hence, aggressive incremental download models can be used without wasteful download of data.

In some embodiments, the master AR server 32 is assumed to have a stateless mode of operation, where it does not maintain any per-client state across transactions. Hence, each transaction is self-contained and contains all the parameters needed to execute correctly. This allows correct functioning of the system even across server crashes and also allows seamless transition across loxel AR servers 36 . . . 40. The following shows example call flows with and without local AR servers being involved. The parameters shown may be, for example, XML data contained in a protocol framework, such as REST or SOAP.

Figure 5:
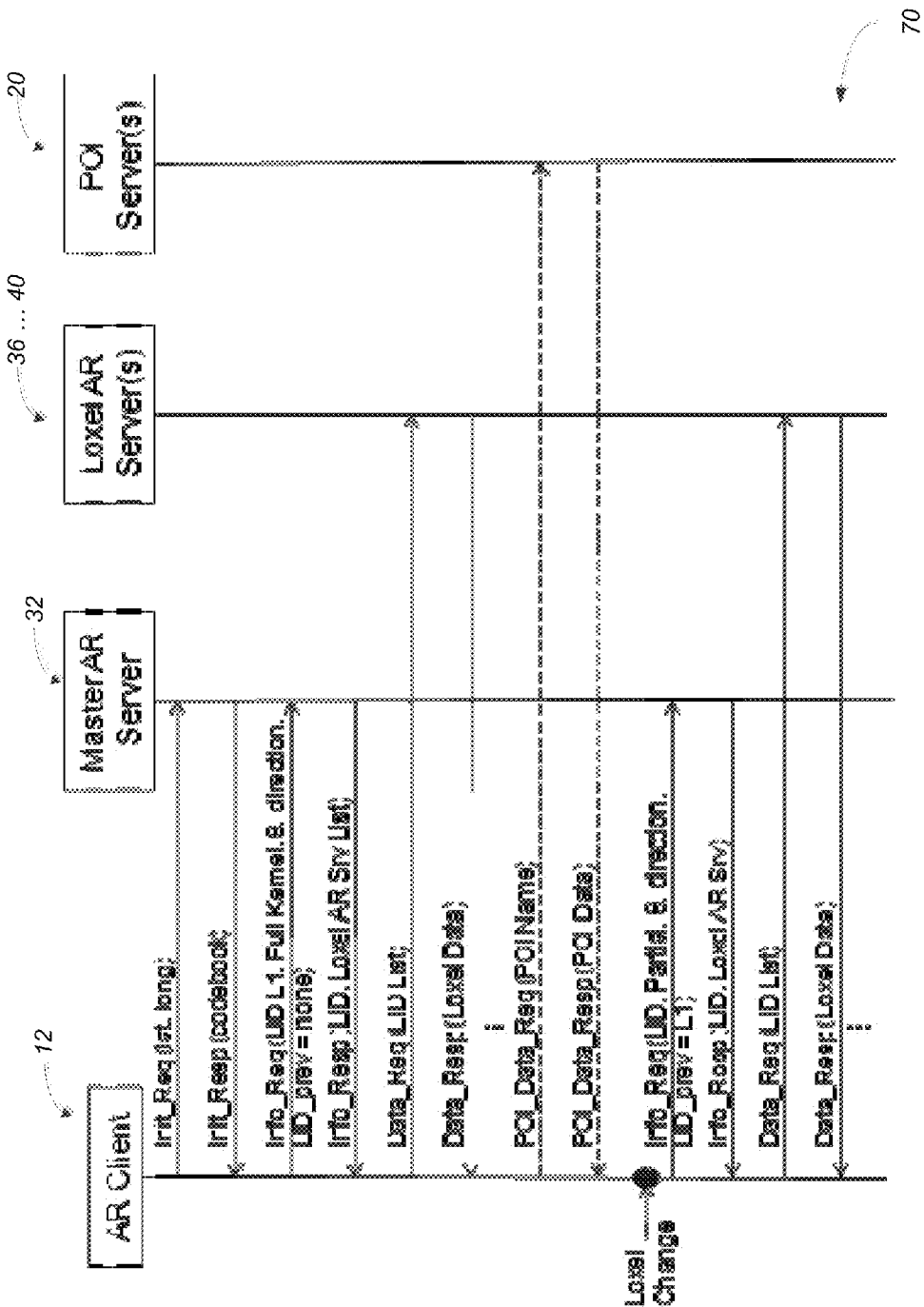
FIG. 5 is a diagram showing an example call flow between an AR client device, a master AR server, loxel AR servers, and POI servers.

An example call flow 70 with no local AR server is shown in FIG. 5 to which reference is now additionally made. The call flow 70 shows the client 12 initializing with a request, Init_Req(lat,long), to the master AR server 32 for the codebook. In this case, it sends its current location (latitude, longitude) to the master AR server 32, and the server responds, Init_Resp(codebook), with a partial codebook around that location. An alternative is for the client 12 to request the entire codebook without sending any location parameters, and the master AR server 32 responds with the full list of code vectors.

The client 12 then sends an information request message, Info_Req(LID L1, Full Kernel, θ, direction, LID_prev=none), with its Loxel ID, requesting image data corresponding to the full kernel corresponding to the LID. It may include information about its orientation and direction of motion if relevant, although these are less relevant when requesting the full kernel information. The client indicates that this is its first request by setting the previous LID to "none;" this may happen when the client is contacting the server for the first time or wants to reset its data because it does not consider any previously downloaded loxels to be relevant for some reason.

As part of the information response message, Info_Resp (LID,Loxel AR Srv List) the master AR server 32 sends the client 12 a list of (loxel ID, loxel AR server ID) pairs indicating to the client 12 which loxel AR server 36 . . . 40 to contact to obtain the image data corresponding to each loxel in the kernel requested. The client 12 then performs a data request/response exchange, Data_Req(LID List), Data_Resp(Loxel Data), with each of the relevant loxel AR servers 36 . . . 40 to obtain the image data it needs. The loxel AR servers 36 . . . 40 return the data from the loxel database corresponding to the LIDs requested. The loxel data obtained contains information about POIs of relevance in the loxels. Depending on the application and user interactions, the client 12 may choose to contact one or more POI servers 20 with a POI Data Request message, POI_Data_Req(POI Name), requesting additional information about the POI. The POI server 20 to which the request was sent responds, POI_Data_Resp(POI Data), with the requested POI data.

Upon detecting a change in the LID, the client 12 may perform another information exchange with the master AR server 32 to request the loxel AR server list corresponding to the new loxels it wishes to download. The messaging shown indicates a partial kernel request, Info_Req(LID,Partial, θ, direction, LID_prev=L1), corresponding to an orientation and/or direction of motion presented along with the request. Additionally, the client 12 presents the previous LID to the master AR server 32, so that the master AR server 32 knows to exclude the already downloaded data (a previous orientation and/or direction of motion should be presented if a partial kernel was downloaded earlier; alternately, a list of loxels already downloaded may be included). The master AR server 32 then responds, Data_Resp(Loxel Data) with the information requested. The client 12 then follows the same procedure as before to download the loxel data from the loxel AR servers 36 . . . 40.

Figure 6:
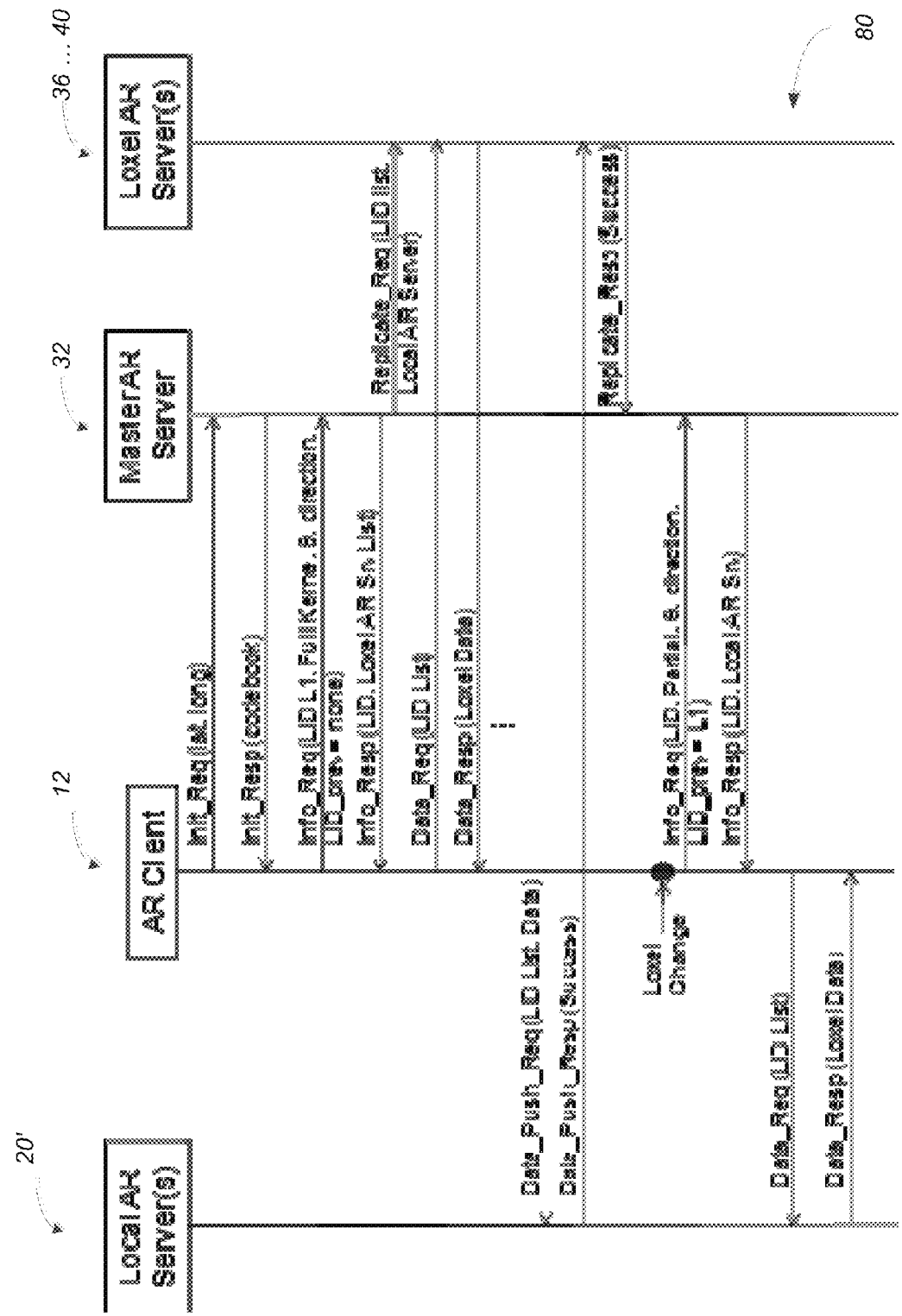
FIG. 6 is a diagram showing an example call flow between an AR client device, a master AR server, loxel AR servers, and local AR servers, illustrating a mechanism by which an AR client device is redirected to a local AR server when relevant information is available at a location closer to the AR client device.

An example of a call flow 80 with a local AR server 20 is shown in FIG. 6, to which reference is now additionally made. The call flow 80 is substantially the same as the call flow 70 described above with reference to FIG. 5, except for the addition of a local AR server 20', which may be one of the special AR server(s) 20 shown in FIG. 1. The call flow 80 shows the mechanism by which a client 12 may be redirected to a local AR server 20' once the relevant information is available at a location closer to the client 12.

The call flow 80 shows the client 12 initializing with a request, Init_Req(lat,long), to the master AR server 32 for the codebook. In this case, it sends its current location (latitude, longitude) to the master AR server 32, and the server responds, Init_Resp(codebook), with a partial codebook around that location. Again, an alternative is for the client 12 to request the entire codebook without sending any location parameters, and the master AR server 32 responds with the full list of code vectors.

The client 12 then sends an information request message, Info_Req(LID L1, Full Kernel, θ, direction, LID_prev=none), with its Loxel ID, requesting image data corresponding to the full kernel corresponding to the LID. It may include information about its orientation and direction of motion if relevant, although these are less relevant when requesting the full kernel information. The client indicates that this is its first request by setting the previous LID to "none;" this may happen when the client is contacting the server for the first time or wants to reset its data because it does not consider any previously downloaded loxels to be relevant for some reason.

As part of the information response message, Info_Resp (LID,Loxel AR Srv List) the master AR server 32 sends the client 12 a list of (loxel ID, loxel AR server ID) pairs indicating to the client 12 which loxel AR server 36 . . . 40 to contact to obtain the image data corresponding to each loxel in the kernel requested.

In the call flow 80, the master AR server 32 additionally initiates caching at the local AR server 20' based on the predicted need of loxel data of the client 12. For instance, upon responding to the client's first information request, the master AR server 32 directs, Replicate_Req(LID list, Local AR Server, the appropriate loxel AR servers 36 . . . 40 to replicate loxel data corresponding to certain LIDs at the local AR server 20'. The appropriate loxel data is then pushed, Data_Push_Req(LID List Data), to the local AR server 20'. The local AR server 20' responds, Data_Push_Resp(Success) to confirm receipt of the replicated loxed data.

When the client contacts the master AR server 32 after a loxel change, Info_Req(LID,Partial, θ, direction, LID_prev=L1), the master AR server 32 redirects the client to the local AR server 20', Info_Resp(LID,Local AR Srv). The client then receives the loxel data by sending a data request, Data_Req(LID List), to the local AR server 20'. The local AR server 20' responds, Data_Resp(Loxel Data) with the requested data.

The local AR server 20' may be identified, for example, using classic DNS style identification mechanisms, or by other suitable mechanism. However, if the local AR server 20' is accessible to the client over some specific medium (such as WiFi), it would help to have the attachment parameters so that the client may obtain the data over a higher speed link.

Figure 7:
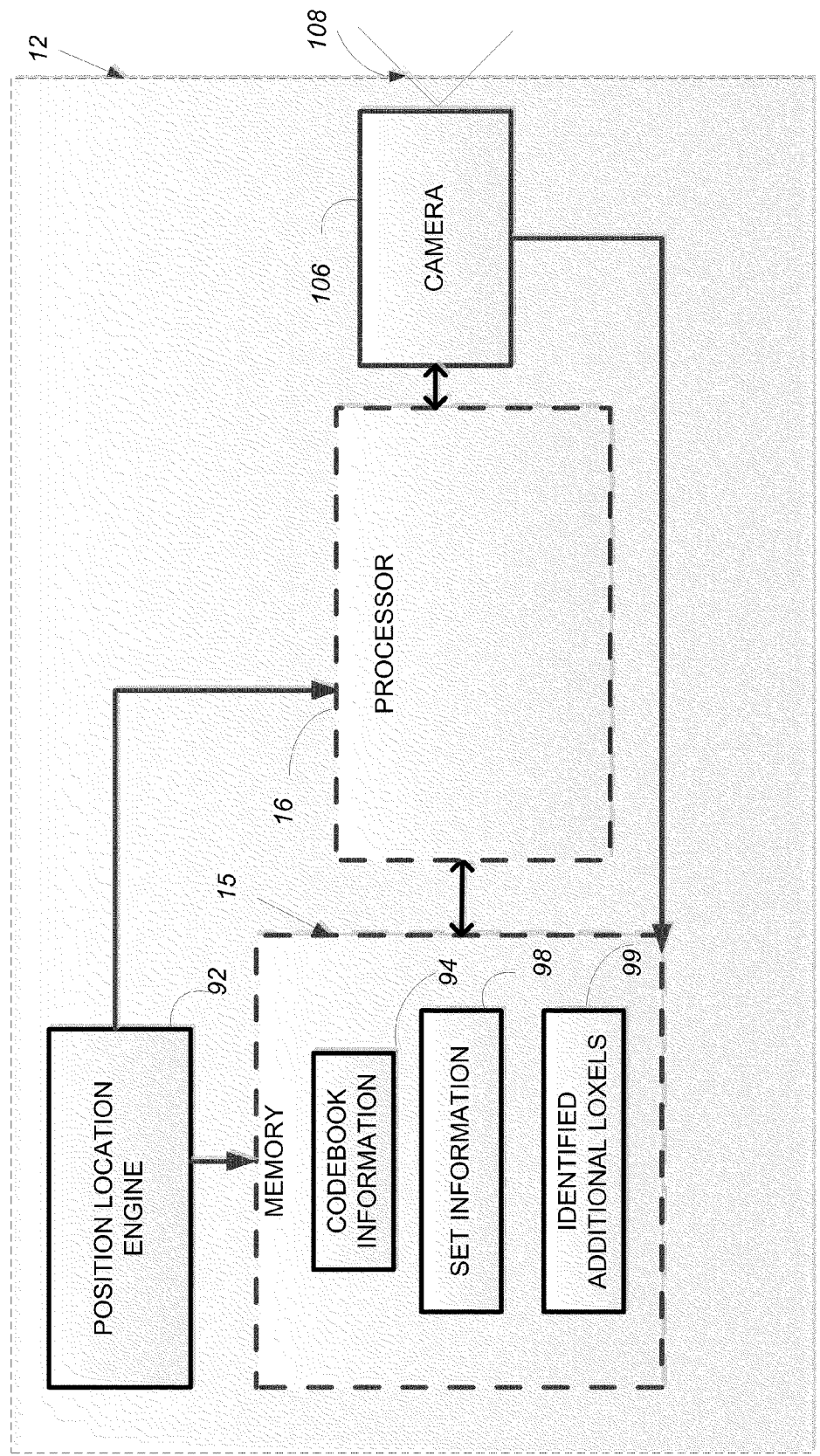
FIG. 7 is a block diagram of an embodiment of a mobile device operating in conjunction with an AR system.

A block diagram of an embodiment of a mobile device (which may be a client device), such as the mobile device 12 which can operate in conjunction with an AR system such as system 10 of FIG. 1, is shown in FIG. 7. The mobile device 12 includes a position location engine 92 for determining its present position, for example, by way of a known GPS or other position location technique. Position location engine 92 need not perform all position-related processing; for example, position location engine 92 may determine information indicative of one or more satellite or terrestrial pseudoranges, then forward the pseudorange information to a network resource to determine the position using the pseudoranges. Mobile device 12 may subsequently receive position information (e.g., latitude and longitude) from the network. Position location engine 92 may be in communication with a processor 16, memory 15, and/or one or more other modules of mobile device 12 such as a transceiver.

Mobile device 12 further includes a memory 15 including codebook information 94. Codebook information 94 includes loxel identifiers such as location vectors of loxels associated with respective geographical areas. In a system such as that shown in FIG. 1, codebook information 94 may be obtained from master AR server 32; for example, location vectors of a plurality of loxels associated with respective geographical areas may be obtained from one or more network resources such as master AR server 32. Mobile device 12 may include a processor 16 to implement the described functionality outlined herein. For example, processor 16 may be configured to access present position information and stored location vectors associated with a plurality of loxels, and to identify a set of loxels based on the present position and the location vectors. The set of the plurality of loxels includes at least an initial loxel in which the present position is located. Set information 98 (AR information associated with the set of loxels) that may be uploaded from the master AR server 32 may be stored in memory 15.

Once the position of the mobile device 12 has been established, processor 16 may be configured to determine if the mobile device 12 has moved outside of the initial loxel. Processor 16 may be further configured to identify additional loxels to upload if the mobile device 12 has moved outside the initial loxel, based on a direction of movement and/or an orientation of the mobile device 12. If additional loxels are identified, mobile device 12 may be configured to initiate upload of the identified additional loxels 99 (AR information associated with the identified additional loxels). In order to determine the orientation of the mobile device 12, the mobile device 12 may be provided with a camera 106, which may be internal or external to the mobile device 12. The camera 106 has a particular field of view 108, which, as mentioned above, may be used to determine the number of additional loxels to download as the mobile device 12 moves from one loxel to the next. Memory 15 may also store information related to one or more AR applications; for example, instructions and/or data to provide augmented reality functions.

"Mobile device" refers to a mobile device of any type; for example, a wireless device, such as a wireless telephone, including cordless telephones, a cellular telephone, a personal communication system (PCS) telephone, a telephone that communicates via satellites or the like, or other type of wireless telephone. The mobile device may also be a two-way radio, such as a walkie-talkie, or other type of communications transceiver, a personal digital assistant with wireless access, a notebook computer with wireless access, or the like. The mobile device has an associated internal or external camera and image display device. Since at least one augmented reality application is assumed to be running on the mobile devices described herein, the term "mobile device" and "client" are be used interchangeably.

Note that the functionality described with reference to FIG. 7 may be implemented in a number of ways. For example, processor 16 may provide some functionality for position location engine 92. In one example, processor 16 may process assistance data, may process pseudorange data to send to one or more network resources, may process received location information, or may provide other processing supporting positioning. Processor 16 may be a single unit, or processing functions may be performed by multiple units. Similarly, memory 15 is shown as a single unit, but information may be stored in different modules of mobile device 12.

In one implementation, a mobile device such as device 12 of FIG. 7 may flexibly download data for one or more AR applications as follows. In the current disclosure, a unique code vector may be associated with a particular loxel. Mobile device 12 may store codebook information 94 in memory 15, so that position information and loxel information may be "decoded." That is, in response to accessing position information indicative of the current position of mobile device 12, mobile device 12 may access codebook information 94 to determine a particular loxel identifier corresponding to the current position. Once the particular loxel identifier is known, AR information associated with the loxel can be accessed and used in one or more AR applications.

In some implementations, loxel size may be flexible. Mobile device 12 may be configured to store information from more or fewer loxels depending on the loxel size (and/or other factors such as bandwidth, memory, AR needs, etc.) This can provide a significant advantage over some previous systems. For an information-dense region, a loxel size such as 10 m×10 m may be used rather than a standard 30 m×30 m loxel size. Mobile device 12 may be able to download AR information for a smaller loxel, or a few smaller loxels, where downloading information for a standard loxel may strain or surpass the resources available to mobile device 12. The current disclosure also provides techniques for downloading loxel information using orientation and/or direction of motion, which may provide additional benefits. Herein, "density" of AR information refers to the amount of AR information per unit area.

In some implementations, mobile device 12 is configured to store codebook information 94 indicative of loxel identifier information associated with a plurality of loxels in memory 15. Mobile device 12 may determine current position information indicative of its current position; for example, position location engine 92 of mobile device 12 may determine the position of the mobile device 12 or may determine some information needed to determine its position, such as pseudoranges to one or more positioning satellites. If the position is not determined at mobile device 12, position information can be transmitted to a network resource to determine the position and transmit it back to mobile device 12. Many positioning techniques can be used; satellite positioning (mobile-based, mobile-assisted, standalone), terrestrial positioning (e.g., Advanced Forward Link Trilateration, WiFi positioning, etc.), as well as combinations of different techniques (hybrid techniques).

Mobile device 12 can access the stored codebook information 94 to determine loxel identifier information for an initial loxel. For example, the loxel identifier information can indicate a location included in a geographic area spanned by the loxel, and the initial loxel can be selected as the loxel whose identifier is closest to the current position of mobile device 12 (e.g., smallest distance). The location included in the geographic area may be indicated by a latitude and a longitude.

In some embodiments, mobile device 12 may transmit at least some of the current position information to one or more network resources using a transmitter (not shown). Mobile device 12 may receive AR information associated with a plurality of loxels in response, using a receiver (not shown). Of course, transmit and receive functionality may both be provided in a transceiver. The plurality of loxels are selected using at least some of the current position information. In some embodiments, mobile device 12 may determine a loxel identifier associated with a loxel to be downloaded and may transmit a request for the loxel to be downloaded. Codebook information 94 may be accessed, and at least one loxel identifier may be selected based on the current position of mobile device 12. The at least one loxel identifier may also be selected based on the current camera view, a usage pattern associated with an AR application, information about the orientation of mobile device 12, and/or information about the movement of mobile device 12 (such as the direction of travel). In different embodiments, the field of view of the camera may be about 70 degrees (e.g., between 65 degrees and 75 degrees), may be about 180 degrees (e.g., between about 175 degrees and about 185 degrees). In other embodiments, different fields of view may be used.

Mobile device 12 may access positioning information to determine if it has moved to a position outside of the geographic area spanned by the current loxel. If so, mobile device 12 may access codebook information 94 to determine additional loxels to download.

In some embodiments, instructions and data for an AR application may be stored in memory 15, and the current techniques may be performed in conjunction with executing instructions for the AR application using processor 16.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. The phrase "computer-readable media" refers to physical computer storage media and does not refer to transitory propagating signals. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with Wi-Fi/WLAN or other wireless networks. In addition to Wi-Fi/WLAN signals, a wireless/mobile station may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). The disclosure may also be implemented in conjunction with pseudolites or a combination of systems that includes pseudolites. The disclosure may also be implemented in conjunction with femtocells or a combination of systems that includes femtocells.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

The words "example" or "exemplary" are used to mean "serving as an instance, illustration, nature, or character of the rest." Any embodiment described herein as "an example" or "exemplary" is not necessarily to be construed as preferred or advantageous over other embodiments.

Although the invention has been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. A client device, comprising:
  memory to store instructions and data associated with an augmented reality (AR) model and to store one or more loxels of AR information;
  a processor to execute instructions associated with the AR model; and
  a camera having an associated camera view;
  wherein the client device is configured to generate a request for one or more additional loxels of AR information, the request including one or more loxel identifiers associated with the additional loxels, and the additional loxels selected using information indicative of a current position of the client device and at least one parameter selected from the group consisting of: information indicative of a current camera view, information indicative of a usage pattern associated with an AR application, and information indicative of movement of the client device, wherein each loxel is associated with a single code vector that indicates a location in a geographic area of the loxel and uniquely identifies the loxel, and wherein the loxel identifiers are computed based on the code vectors.

2. The client device of claim 1, wherein the memory is further to store codebook information including a plurality of loxel identifiers.

3. The client device of claim 2 wherein the memory is further to store instructions to process a plurality of loxel sizes.

4. The client device of claim 3, wherein the client device is configured to request one or more additional loxels of AR information having a first size at a first time, further to request one or more additional loxels of AR information having a second size at a second time.

5. The client device of claim 4 wherein the first size is less than the second size, and wherein AR information of the loxel of the first size is more dense than AR information of the loxel of the second size.

6. The client device of claim 2 wherein the client device is configured to generate a further request for one or more additional loxels of AR information in response to detecting an updated position of the client device.

7. The client device of claim 6, wherein the client device is configured to generate a further request for one or more additional loxels of AR information in response to detecting an updated position of the client device.

8. The client device of claim 7, the client device is further configured to identify the one or more additional loxels by accessing the codebook information and identifying a loxel code vector at the closest Euclidean distance from the updated position.

9. An augmented reality (AR) apparatus, comprising:
memory storing AR data organized into kernels of AR information, each kernel of AR information including a plurality of loxels of AR information and associated with a loxel code vector indicative of a geographic area of the loxel, wherein the AR data comprises at least one loxel of a first size and at least one loxel of a second different size; and
wherein the AR apparatus is configured to transmit codebook information to a client device, the codebook information including loxel identifier information for at least some of the plurality of loxels,
wherein the AR apparatus is further configured to access a request from a client device for additional loxels, the request including one or more loxel identifiers associated with the additional loxels, and to transmit the additional loxels to the client device in response to the request, wherein each loxel is associated with a single code vector that indicates a location in a geographic area of the loxel and uniquely identifies the loxel, and wherein the loxel identifiers are computed based on the code vectors.

10. The AR apparatus of claim 9, the first size is smaller than the second size, and wherein the AR information included in the at least one loxel of the first size is more dense than the AR information included in the at least one loxel of the second size.

11. The AR apparatus of claim 9, wherein said loxel code vector indicative of a geographic area of the loxel comprises information indicative of a latitude and longitude of a location included in the geographic area of the loxel.

12. A method for using a client device, comprising:
storing codebook information indicative of loxel identifier information associated with a plurality of loxels at the client device;
determining current position information indicative of a current position of the client device;
accessing the stored codebook information to determine loxel identifier information for an initial loxel associated with at least the current position of the client device; and
determining a loxel identifier associated with a loxel to be downloaded and transmitting a request for the loxel to be downloaded, the request including the loxel identifier associated with the loxel to be downloaded, wherein each loxel is associated with a single code vector that indicates a location in a geographic area of the loxel and uniquely identifies the loxel, and wherein the loxel identifiers are computed based on the code vectors.

13. The method of claim 12 wherein said determining current position information indicative of the current position of the client device comprises determining the current position information using one or more positioning techniques selected from the group consisting of: satellite positioning, assisted satellite positioning, and terrestrial positioning.

14. The method of claim 12 further comprising transmitting at least some of the current position information to one or more network resources and receiving AR information associated with a plurality of loxels in response, wherein the plurality of loxels are selected using at least some of the current position information.

15. The method of claim 12, wherein determining a loxel identifier associated with a loxel to be downloaded comprises accessing the codebook information and selecting at least one loxel identifier based on the current position of the client device and one or more parameters selected from the group consisting of: information indicative of a current camera view, information indicative of a usage pattern associated with an AR application, and information indicative of movement of the client device.

16. The method of claim 12 further comprising:
determining whether the client device has moved to an updated position outside a geographic area associated with said initial loxel;
if said client device has moved to an updated position outside said geographic area associated with the initial loxel, accessing the stored codebook information to determine loxel identifier information for one or more different loxels associated with at least the updated position of the client device; and
requesting AR information associated with said one or more different loxels.

17. The method of claim 16 wherein accessing the stored codebook information to determine loxel identifier information for one or more different loxels associated with at least the updated position of the client device comprises identifying said one or more different loxels based on a direction of motion of said client device.

18. The method of claim 16 wherein said accessing the stored codebook information to determine loxel identifier information for one or more different loxels associated with at least the updated position of the client device comprises identifying said one or more different loxels based on an orientation of said client device.

19. The method of claim 16 wherein said accessing the stored codebook information to determine loxel identifier information for one or more different loxels associated with at least the updated position of the client device comprises identifying said one or more different loxels based on a field of view of a camera associated with said client device.

20. The method of claim 19 wherein said field of view of said camera is included in a range from 65 to 75 degrees.

21. The method of claim 19 wherein said field of view of said camera is included in a range from 175 to 185 degrees.

22. The method of claim 12 wherein accessing the stored codebook information to determine loxel identifier information for the initial loxel associated with at least the current position of the client device comprises determining the loxel code vector indicative of a location closest to said current position.

23. The method of claim 22 wherein determining the loxel code vector indicative of a location closest to said current position comprises determining a Euclidian distance between said current position of the client device and a plurality of said loxel code vectors indicative of the location in the geographic area of the loxel.

24. The method of claim 15 wherein said loxel code vector information associated with each loxel is a latitude, longitude pair of a location in a geographic area of the loxel.

25. The method of claim 12, further comprising receiving the codebook information indicative of loxel identifier information associated with a plurality of loxels from an AR server.

26. The method of claim 25, further comprising running an AR application on said client device and requesting said codebook information based on running the AR application on the client device.

27. A mobile device, comprising:
- means for storing codebook information indicative of loxel identifier information associated with a plurality of loxels at the client device;
- means for determining current position information indicative of a current position of the client device;
- means for accessing the stored codebook information to determine loxel identifier information for an initial loxel associated with at least the current position of the client device;
- means for determining a loxel identifier associated with a loxel to be downloaded; and
- means for transmitting a request for the loxel to be downloaded, the request including the loxel identifier associated with the loxel to be downloaded, wherein each loxel is associated with a single code vector that indicates a location in a geographic area of the loxel and uniquely identifies the loxel, and wherein the loxel identifiers are computed based on the code vectors.

28. The mobile device of claim 27 wherein said means for determining current position information indicative of the current position of the client device comprises means for determining the current position information using one or more positioning techniques selected from the group consisting of satellite positioning, assisted satellite positioning, and terrestrial positioning.

29. The mobile device of claim 27 further comprising means for transmitting at least some of the current position information to one or more network resources and for receiving AR information associated with a plurality of loxels in response, wherein the plurality of loxels are selected using at least some of the current position information.

30. The mobile device of claim 27, wherein the means for determining a loxel identifier associated with a loxel to be downloaded comprises means for accessing the codebook information and selecting at least one loxel identifier based on the current position of the client device and one or more parameters selected from the group consisting of: information indicative of a current camera view, information indicative of a usage pattern associated with an AR application, and information indicative of movement of the client device.

31. A non-transitory computer readable medium storing instructions configured to cause one or machines to perform operations comprising:
- storing codebook information indicative of loxel identifier information associated with a plurality of loxels at the client device;
- accessing current position information indicative of a current position of the client device;
- accessing the stored codebook information to determine loxel identifier information for an initial loxel associated with at least the current position of the client device;
- determining a loxel identifier associated with a loxel to be downloaded; and
- generating a request for the loxel to be downloaded, the request including the loxel identifier associated with the loxel to be downloaded, wherein each loxel is associated with a single code vector that indicates a location in a geographic area of the loxel and uniquely identifies the loxel, and wherein the loxel identifiers are computed based on the code vectors.

32. The non-transitory computer readable medium of claim 31, wherein determining a loxel identifier associated with a loxel to be downloaded comprises accessing the codebook information and selecting at least one loxel identifier based on the current position of the client device and one or more parameters selected from the group consisting of: information indicative of a current camera view, information indicative of a usage pattern associated with an AR application, and information indicative of movement of the client device.

* * * * *